United States Patent [19]

Sakai et al.

[11] Patent Number: 4,742,414
[45] Date of Patent: May 3, 1988

[54] ROTARY MAGNETIC HEAD DEVICE FOR MAGNETIC RECORDING/REPRODUCTION APPARATUS

[75] Inventors: Kazuo Sakai; Takao Terayama, both of Ibaraki; Teizo Tamura, Katsuta, all of Japan

[73] Assignee: Hitachi, Ltd., Tokyo, Japan

[21] Appl. No.: 792,272

[22] Filed: Oct. 28, 1985

[30] Foreign Application Priority Data

Oct. 31, 1984 [JP] Japan ................. 59-227740

[51] Int. Cl.⁴ .............................................. G11B 15/60
[52] U.S. Cl. .................. 360/130.24; 360/84; 360/108
[58] Field of Search .................... 360/84–85, 360/107–108, 130.24; 242/197–200

[56] References Cited

U.S. PATENT DOCUMENTS

| | | | |
|---|---|---|---|
| 3,867,725 | 2/1975 | Janssen | 360/102 |
| 4,301,487 | 11/1981 | Maruyama | 360/130.24 |
| 4,366,519 | 12/1982 | Maruyama | 360/130.24 |
| 4,525,757 | 6/1985 | Imanishi | 360/130.24 |

Primary Examiner—A. J. Heinz
Attorney, Agent, or Firm—Antonelli, Terry & Wands

[57] ABSTRACT

Disclosed is a rotary magnetic head device for a magnetic recording/reproducing apparatus including image signal transmitters. A dynamic pressure type bearing is provided on one of a rotary member and a stationary member, for generating a dynamic pressure to maintain a gap between the signal transmitters constant.

16 Claims, 4 Drawing Sheets

ROTARY MAGNETIC HEAD DEVICE FOR MAGNETIC RECORDING/REPRODUCTION APPARATUS

BACKGROUND OF THE INVENTION

1. Field of the Invention

The present invention relates to a rotary magnetic head device for a magnetic recording/reproducing apparatus and, more particularly, it relates to a rotary magnetic head device including a dynamic pressure type bearing suitable for controlling a gap between rotary transformers or transmitters.

2. Related Art Statement

Heretofore, a rotary magnetic head device for a magnetic recording/reproducing apparatus has been so constructed that a rotary shaft of the head device is supported by two ball bearings and a preliminary pressure is applied axially to the ball bearings so as to maintain the shaft in position at a high accuracy.

With the above construction, a transmitter is provided on each of an upper rotatable cylinder and a lower stationary cylinder of the magnetic rotary head device, in order to transmit an electric output from the rotary magnetic head to a stator without causing any contact therebetween. It is necessary to set a gap between the transmitters constant at a high accuracy. Generally, the gap is set on the order of several ten microns. If the gap is too large, the efficiency of the transmission of the electric signal would be lowered. On the other hand, if the gap is too small, contact between the transmitters might occur resulting in variation in the speed of rotation.

As disclosed in Japanese Patent Laid-Open No. 56-22215 and Japanese Patent Laid-Open No. 56-20829, a construction has been proposed in which rotary transmitters are formed in a cylindrical shape so that the signal transmitting characteristics of the rotary transmitters are not deteriorated even though the accuracy in the adjustment of the axial positions of the rotary transmitters is lowered to some extent. In this case, however, problems arise that the control of the gap between the transmitters is not easy, because it becomes necessary to sufficiently control the accuracy of working and assembling of the rotary transmitters.

OBJECT AND SUMMARY OF THE INVENTION

An object of the present invention is to provide a rotary magnetic head device which can easily set a gap between a pair of rotary transformers or transmitters serving as signal transmitting means, at a high accuracy.

Another object of the present invention is to provide a rotary magnetic head device which is high in productivity.

In order to achieve the above objects, the present invention provides a rotary magnetic head device wherein a dynamic pressure type bearing is provided on one of a rotatable cylinder assembly and a stationary cylinder assembly for generating a dynamic pressure to adjust a gap between a pair of signal transmitters of signal transmitting means. A floating force generated by the dynamic pressure type bearing is utilized such that, when the rotatable cylinder assembly is rotating at a constant speed, it is held in floating state by virtue of the fluid force thereby permitting the gap between the signal transmitters to be automatically kept at a high accuracy.

DETAILED DESCRIPTION OF THE PREFERRED EMBODIMENTS

Embodiments of the present invention will be described hereinafter with reference to the accompanying drawings.

Figure 1:
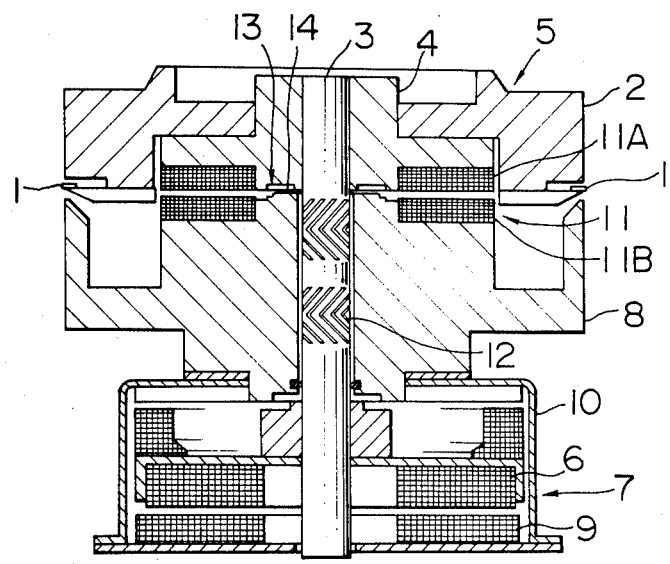
FIG. 1 is a longitudinal cross-sectional view showing an embodiment of a rotary magnetic head device of the present invention.
Figure 2:
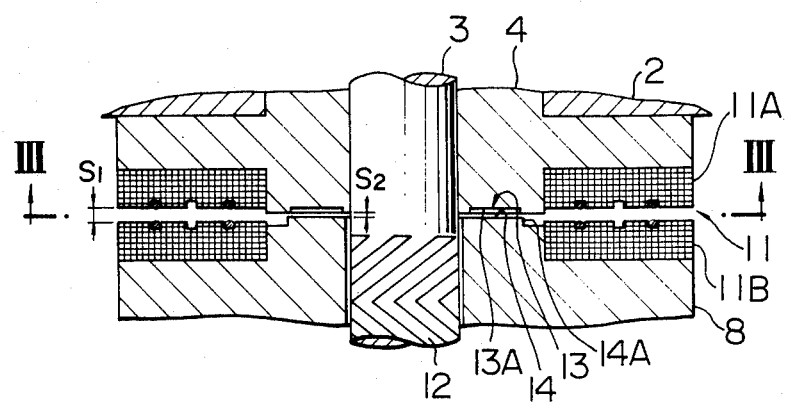
FIG. 2 is an enlarged, longitudinal cross-sectional view showing a principal portion of the embodiment of the rotary magnetic head device shown in FIG. 1.
Figure 3:
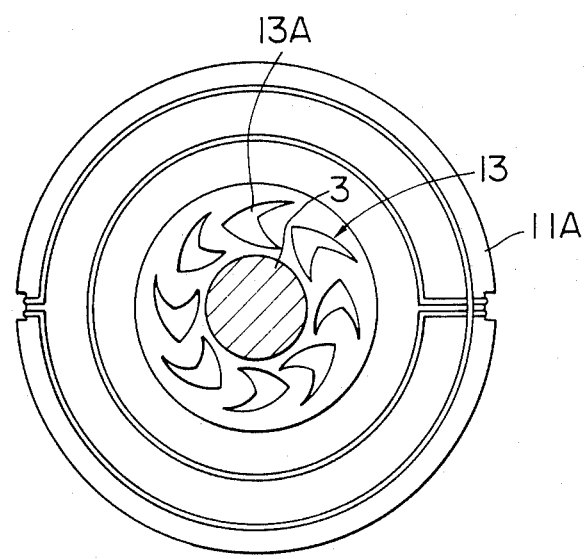
FIG. 3 is a cross-sectional view taken along the line III—III in FIG. 2.

FIG. 1 shows an embodiment of a rotary magnetic head device in accordance with the present invention, which comprises a rotatable cylinder assembly for rotating a magnetic rotary head 1 and a stationary cylinder assembly for supporting the rotatable cylinder assembly. The rotatable cylinder assembly comprises an upper rotary section 5 which includes a rotatable upper cylinder 2 having mounted thereon the magnetic rotary head 1 and a rotary disc 4 secured to an upper portion of a rotary shaft 3 and having replaceably mounted thereon the upper cylinder 2, and a lower rotary section 7 having a rotor magnet 6 secured to a lower portion of the rotary shaft 3. The upper and lower rotary sections 5 and 7 are assembled in unison with the shaft 3 so as to be simultaneously rotated. The stationary cylinder assembly includes a lower stationary cylinder 8 located between the upper and lower rotary sections 5 and 7, a motor coil 9 disposed facing to the rotor magnet 6 which constitutes the lower rotary section 7, and a chassis 10 for fixedly supporting the lower cylinder 8 and the motor coil 9. Image signal transmitting means (rotary transformers) 11 is provided at a location where the rotary disc 4 of the upper cylinder 2 faces to the lower cylinder 8. The transmitting means 11 is comprised of a rotatable image signal transmitter (rotary transformer) 11A mounted on the rotary disc 4 and a non-rotatable image signal transmitter (stator transformer) 11B mounted on the lower cylinder 8. A first dynamic pressure type bearing 12 is provided on an outer peripheral surface of the rotary shaft 3 facing to an inner peripheral surface of the lower cylinder 8, for suppressing the radial movement of the rotary shaft 3. A second dynamic pressure type bearing 13 of a plane type is provided on a portion of the rotary disc 4 which is located radially inwardly of the transmitter 11A. A planar bearing portion 14 is formed on a portion of the lower cylinder 8 which faces to the second dynamic pressure type bearing 13, to insure that the pressure generated by the second dynamic pressure type bearing 13 has a predetermined value. The detailed construction of the planar bearing portion 14, the second dynamic pressure type bearing 13 and the signal transmitting means 11 is shown in FIGS. 2 and 3. The second dynamic pressure type bearing 13 comprises a plurality of grooves 13A in the form of an arrow. A liquid serving as a lubricant, for example, is sealed in a gap between the second dynamic pressure type bearing 13 and the planar bearing portion 14.

The operation of the embodiment of the rotary magnetic head device of the present invention described above will be described below.

Figure 4:
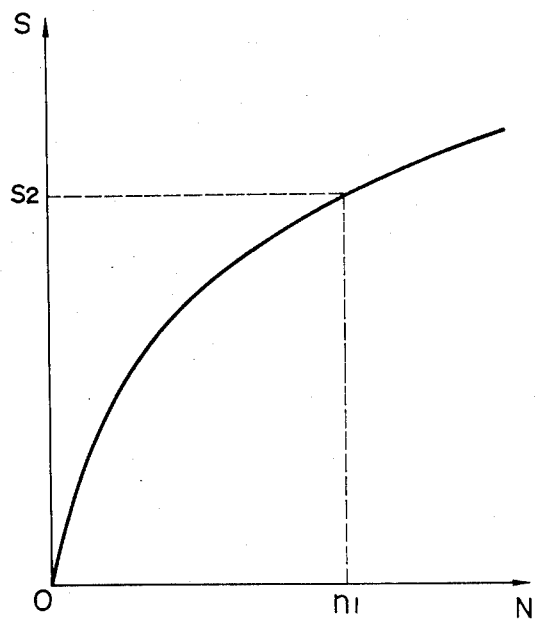
FIG. 4 is a diagram showing a characteristic curve of the dynamic pressure type bearing used in the present invention.

When the relative velocity v between the rotatable image signal transmitter 11A and the non-rotatable image signal transmitter 11B of the signal transmitting means 11 is zero, the second dynamic pressure type bearing 13 is substantially brought into contact with the planar bearing portion 14 ($S_2=0$) by virtue of the weight F of the upper cylinder 2, the rotary disc 4, the rotary shaft 3 and the like. As the rotational speed of the signal transmitting means 11 increases, a dynamic pressure is generated at the second dynamic pressure type bearing 13, so that the gap S increases by the dynamic pressure, as shown in FIG. 4, and is kept at a constant value $S_2$ at a predetermined rotational speed $n_1$. Accordingly, due to the arrangement in which the upper cylinder 2 is axially movable, a small gap $S_1$ can be automatically formed between the transmitters 11A and 11B of the signal transmitting means 11 by virtue of the action of the dynamic pressure generated by the second dynamic pressure type bearing 13. Thus, it is totally unnecessary to effect adjustment of the gap during assembly of the rotary magnetic head device as having been required in a conventional rotary magnetic head device.

The illustrated embodiment in which the second dynamic pressure type bearing 13 is located radially inwardly of the signal transmitting means 11 makes it possible to reduce a friction loss at the bearing portion thereby enhancing the efffectiveness. It is, however, not necessary to limit the provision of the second dynamic pressure type bearing 13 at a radially inward location with respect to the signal transmitting means 11. Further, it is also possible to make the entire size of the device compact while the above-described advantage is obtained, by the arrangement in which the dynamic pressure type bearing is provided on the planar bearing portion of the rotary disc 4 (the necessary width may be 2-4 mm).

Figure 5:
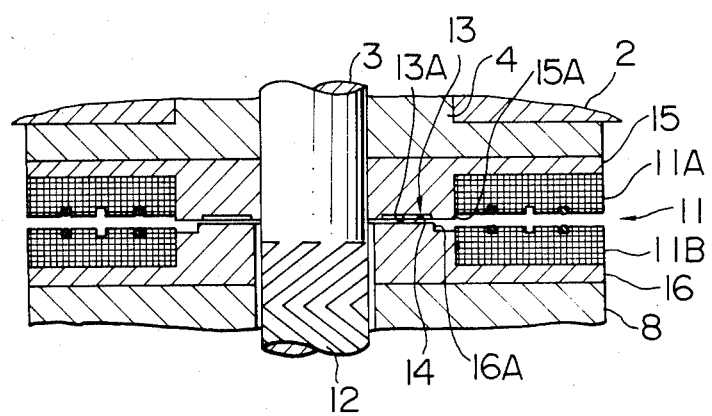
FIG. 5 is a view similar to FIG. 2, but showing anther embodiment of a rotary magnetic head device of the present invention.

The above-described embodiment is the case where the amount of floating $S_2$ caused by the second dynamic pressure type bearing 13 is utilized to set the gas $S_1$ required for the transmitting characteristics of the signal transmitting means 11 or the like. In case, however, where it is difficult for the gaps $S_2$ and $S_1$ to have a predetermined relationship in performance, a stepped portion 14A may be provided, as shown in FIG. 2, to adjust the gaps $S_1$ and $S_2$. The stepped portion 14A may be formed on the end surface of the rotary disc 4. Further, as shown in FIG. 5 which illustrates another embodiment of the present invention, the transmitters 11A and 11B of the signal transmitting means 11 may be provided on bearing members 15 and 16, respectively, which in turn are mounted on the rotary disk 4 and the lower cylinder 8, respectively, and the second dynamic pressure type bearing 13 may be provided on the surface of the bearing member 15. In this case, it may be sufficient if the working accuracy of the stepped portions 15A and 16A are restrained to a required accuracy. Further, the gap $S_2$ may be adjusted depending upon the viscosity of the lubricant, the configuration of the grooves of the second dynamic pressure type bearing 13, and the like, even if the rotational speed is kept constant.

Figure 6:
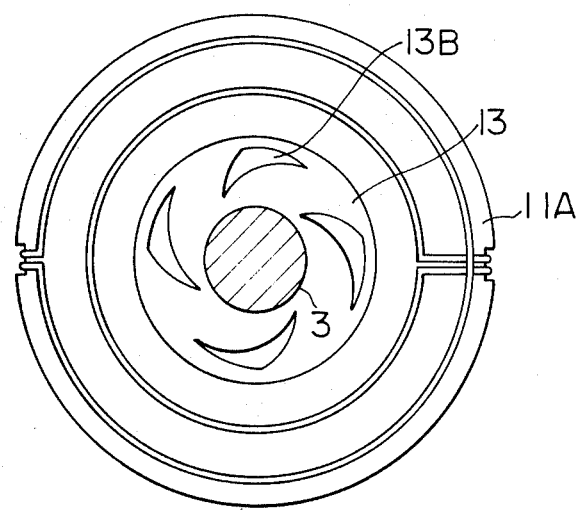
FIG. 6 is a view similar to FIG. 3, but showing a modification of the dynamic pressure type bearing.

Further, the configuration of the grooves of the second dynamic pressure type bearing 13 is not limited to that of the arrow-like grooves 13A shown in FIG. 3, but spiral-like grooves 13B shown in FIG. 6 may be used.

Figure 7:
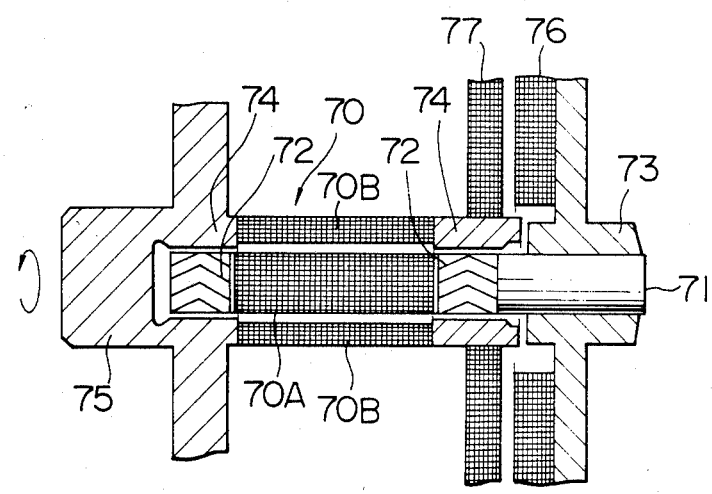
FIG. 7 is a longitudinal cross-sectional view showing a still further embodiment of a rotary magnetic head device of the present invention.

Although the embodiments of the present invention have been described as utlizing the signal transmitting means 11 of a plane type, the present invention may be applied to signal transmitting means of a journal type. Specifically, as shown in FIG. 7, a stationary transmitter 70A of signal transmitting means 70 is fixedly mounted on a stationary shaft 71. Grooves 72 for a dynamic pressure bearing are formed on the shaft 71 at both sides of the transmitters 70A. The shaft 71 is supported by a stationary cylinder 73 in an embedded manner. A rotatable cylinder assembly includes a transmitter 70B of the signal transmitting means 70 and a rotatable cylinder 75 having cylindrical portions 74 at both sides of the transmitter 70B for receiving the bearing pressure. The rotatable cylinder 75 is rotatable about the shaft 71 by motor portions 76 and 77. A pressure is generated at the dynamic pressure type bearing portions by the rotation of the cylinder 75 so that the cylinder 75 is floated in spaced relation from the shaft 71 thereby automatically adjusting a gap between the transmitters 70A and 70B of the signal transmitting means 70. Similarly to the embodiment illustrated in FIGS. 1–3, stepped portions may be provided on the signal transmitting means 70 and the bearing portions or grooves 72.

According to the present invention, since the gap between the rotary transformers or transmitters is automatically adjusted by the dynamic pressure type bearing, the working accuracy as well as the time or the adjustment can be largely reduced, while the productivity is enhanced, to thereby afford superior advantages both in performance and economy.

What is claimed is:

1. A rotary magnetic head device for a magnetic recording/reproducing apparatus, comprising:
    a rotatable cylinder assembly having a rotary magnetic head;
    a stationary cylinder assembly;
    image signal transmitting means having an image signal transmitter mounted on one surface of said rotatable cylinder assembly and an image signal transmitter mounted on one surface of said stationary cylinder assembly which opposes the one surface of said rotatable cylinder assembly; and
    a dynamic pressure type bearing means for directly acting upon the one surface of the rotatable and stationary cylinder assemblies having the image signal transmitting means mounted thereon, the dynamic pressure type bearing means including grooves provided in one of the one surface of said rotatable cylinder assembly and the one opposing surface of said stationary cylinder assembly having the image signal transmitting means mounted thereon and cooperating with an opposing surface provided in the other of the one surface of said rotatable cylinder assembly and the one opposing surface of said stationary cylinder assembly having the image signal transmitting means mounted thereon, for generating a dynamic pressure when said rotatable cylinder assembly rotates relative to said stationary cylinder assembly so as to maintain constant a gap between said image signal transmitter of said rotatable cylinder assembly and said image signal transmitter of said stationary cylinder assembly.

2. A rotary magnetic head device as defined in claim 1, wherein said dynamic pressure type bearing means is provided on the one surface of one of said rotatable cylinder assembly rotatable around a vertical axis and said stationary cylinder assembly opposing thereto, which surface faces to a stepped portion integrally projecting from the opposing surface of the other of said rotatable and stationary cylinder assemblies.

3. A rotary magnetic head device as defined in claim 2, wherein said dynamic pressure type bearing means is located radially inwardly of said image signal transmitting means.

4. A rotary magnetic head device as defined in claim 1, wherein said dynamic pressure type bearing means is provided on one of a surface of a bearing member mounted on said rotatable cylinder assembly rotatable around a vertical axis and the opposing surface of a bearing member mounted on said stationary cylinder assembly facing to said rotatable cylinder assembly.

5. A rotary magnetic head device as defined in claim 4, wherein said dynamic pressure type bearing means is located radially inwardly of said image signal transmitting means.

6. A rotary magnetic head device as defined in claim 1, wherein said dynamic pressure type bearing means is provided on a peripheral surface of one of a stationary shaft of said stationary cylinder assembly, said stationary shaft being disposed horizontally and a rotary member of said rotatable cylinder assembly disposed in opposing relationship thereto.

7. A rotary magnetic head device as defined in claim 6, wherein said image signal transmitter mounted on said stationary shaft of said stationary cylinder assembly has opposite sides, and said dynamic pressure type bearing means includes portions provided on each side of said image signal transmitter mounted on said stationary shaft of said stationary cylinder assembly.

8. A rotary magnetic head device as defined in claim 1, wherein said rotatable cylinder assembly is rotatable about a shaft, and said grooves in said one surface cooperate with said one opposing surface so as to enable generation of the dynamic pressure when said rotatable cylinder assembly rotates relative to said stationary cylinder assembly so that said rotatable cylinder assembly moves in a longitudinal direction of the shaft.

9. A magnetic recording/reproducing apparatus comprising:
a rotary shaft having an axis;
a rotatable cylinder mounted for rotation around the axis of said rotary shaft;
at least one magnetic head mounted on a periphery of said rotatable cylinder;
a stationary cylinder having at a center thereof bearing means for supporting said rotary shaft for rotation about the axis thereof;
signal transmitting means including a first image signal transmitter mounted on one surface of said rotatable cylinder extending perpendicularly to the axis of said rotary shaft and a second image signal transmitter mounted on one surface of said stationary cylinder extending perpendicularly to the axis of said rotary shaft and facing to said one surface of said rotatable cylinder; and
dynamic pressure type bearing means for directly acting upon the one surface of the rotatable and stationary cylinders having the signal transmitting means mounted thereon, the dynamic pressure type bearing means including a plurality of grooves provided in the one surface of one of the rotatable and stationary cylinders having the signal transmitting means mounted thereon and a bearing surface portion provided in the one opposing surface of the other of said rotatable and stationary cylinders having the image signal transmitting means mounted thereon, said grooves and said bearing surface portion cooperating with each other to generate a dynamic pressure during rotation of said rotatable cylinder relative to said stationary cylinder so as to maintain a gap between said first and second image signal transmitters constant over substantially an opposing area of said first and second image signal transmitters.

10. A magnetic recording/reproducing apparatus as defined in claim 9, wherein the axis of said rotary shaft extends vertically, and said opposing surface has a stepped portion integrally projecting therefrom to delimit said bearing surface portion.

11. A magnetic recording/reproducing apparatus as defined in claim 10, wherein said dynamic pressure type bearing means is arranged radially inwardly of said signal transmitting means.

12. A magnetic recording/reproducing apparatus as defined in claim 9, wherein the axis of said rotary shaft extends vertically, said rotatable cylinder has mounted thereon a bearing member delimiting said surface of said rotatable cylinder which extends perpendicularly to the axis of said rotary shaft, and said stationary cylinder has mounted thereon a bearing member delimiting said surface of said stationary cylinder which extends perpendicularly to the axis of said rotary shaft and which faces to said surface of said rotatable cylinder.

13. A magnetic recording/reproducing apparatus as defined in claim 12, wherein said dynamic pressure type bearing means is arranged radially inwardly of said signal transmitting means.

14. A magnetic recording/reproducing apparatus comprising:
a stationary shaft having an axis extending horizontally;
a rotatable cylinder mounted for rotation about the axis of said stationary shaft;
at least one magnetic head mounted on a periphery of said rotatable cylinder;
signal transmitting means including a first image signal transmitter mounted on said rotatable cylinder and a second image signal transmitter mounted on said stationary shaft for cooperation with said first image signal transmitter; and
dynamic pressure type bearing means including a plurality of grooves provided in one of a peripheral surface of said stationary shaft having said second image signal transmitter mounted thereon and a surface of said rotatable cylinder having said first image signal transmitter mounted thereon which faces to said peripheral surface of said stationary shaft, and a bearing surface portion provided in the other of the peripheral surface of said stationary shaft having said second image signal transmitter mounted thereon and the facing surface of said rotatable cylinder having said first image signal transmitter mounted thereon, said grooves and said bearing surface portion cooperating with each other to generate a dynamic pressure during rotation of said rotatable cylinder relative to said stationary shaft so as to maintain constant a gap between said first and second image signal transmitters, said dynamic pressure type bearing means acting directly upon the surfaces having said first and second image signal transmitters mounted thereon.

15. A magnetic recording/reproducing apparatus as defined in claim 14, wherein said second image signal transmitter has opposite sides and portions of said dynamic pressure type bearing means are respectively located on opposite sides of said second image signal transmitter mounted on said stationary shaft.

16. A recording/reproducing apparatus comprising:
a stationary cylinder;
a shaft;
a rotatable cylinder disposed in facing relation to said stationary cylinder through said shaft;
signal transmitting means including a first signal transmitter mounted on one surface of said stationary cylinder and a second signal transmitter mounted on one surface of said rotatable cylinder which opposes said one surface of said stationary cylinder;
means for supporting said rotatable cylinder for movement along said shaft; and
dynamic pressure type bearing means for directly acting upon said one surface of said stationary and rotatable cylinders having said signal transmitting means mounted thereon, said dynamic pressure type bearing means including a plurality of grooves provided in one of said one surface of said stationary cylinder and said rotatable cylinder having said signal transmitting means mounted thereon and a bearing surface portion provided in said one opposing surface of the other of said stationary and rotatable cylinders having said signal transmitting means mounted thereon, said grooves and said bearing surface portion cooperating with each other to generate a dynamic pressure during rotation of said rotatable cylinder relative to said stationary cylinder so as to maintain a gap between said first and second image signal transmitters constant over substantially an opposing area of said first and second image signal transmitters.

* * * * *